US007936530B1

(12) United States Patent
Ton-That et al.

(10) Patent No.: US 7,936,530 B1
(45) Date of Patent: May 3, 2011

(54) METHOD TO WRITE RAMP-TRACK

(75) Inventors: Luan Ton-That, San Jose, CA (US);
Edward Ying, Berkeley, CA (US)

(73) Assignee: Marvell International Ltd., Hamilton (BM)

( * ) Notice: Subject to any disclaimer, the term of this patent is extended or adjusted under 35 U.S.C. 154(b) by 322 days.

(21) Appl. No.: 12/186,441

(22) Filed: Aug. 5, 2008

Related U.S. Application Data

(60) Provisional application No. 60/965,397, filed on Aug. 20, 2007.

(51) Int. Cl.
*G11B 21/12* (2006.01)
*G11B 5/55* (2006.01)

(52) U.S. Cl. ............................................. 360/55; 360/75
(58) Field of Classification Search .................... None
See application file for complete search history.

(56) References Cited

U.S. PATENT DOCUMENTS

| | | | |
|---|---|---|---|
| 7,145,744 B1 * | 12/2006 | Clawson et al. | 360/75 |
| 7,209,312 B1 | 4/2007 | Sutardja | |
| 7,248,427 B1 * | 7/2007 | Everett et al. | 360/75 |
| 7,321,479 B2 * | 1/2008 | Kim et al. | 360/75 |
| 7,333,286 B2 * | 2/2008 | Jung et al. | 360/75 |
| 7,423,831 B2 * | 9/2008 | Gami et al. | 360/75 |
| 7,457,074 B2 * | 11/2008 | Sado et al. | 360/75 |
| 7,468,859 B2 | 12/2008 | Hansen et al. | |
| 7,522,370 B1 | 4/2009 | Sutardja | |
| 7,561,366 B2 | 7/2009 | Wasa et al. | |
| 7,576,937 B2 | 8/2009 | Nojiri et al. | |
| 7,619,848 B2 | 11/2009 | Park et al. | |
| 7,630,161 B2 * | 12/2009 | Nakajima et al. | 360/75 |
| 7,710,682 B2 * | 5/2010 | Mizukoshi et al. | 360/75 |
| 7,738,200 B2 * | 6/2010 | Annampedu et al. | 360/75 |
| 7,751,144 B1 | 7/2010 | Sutardja | |
| 2006/0171058 A1 * | 8/2006 | Chan et al. | 360/75 |
| 2008/0137226 A1 * | 6/2008 | Ueda et al. | 360/77.06 |

OTHER PUBLICATIONS

U.S. Appl. No. 12/192,973, "Calibrating Voice Coil Motors", filed Aug. 15, 2008, to be published by the USPTO, application as filed, 30 pages.

* cited by examiner

*Primary Examiner* — Hoa T Nguyen
*Assistant Examiner* — James L Habermehl

(57) ABSTRACT

The present disclosure includes systems and techniques relating to writing ramp-tracks on a computer readable medium. In some implementations, a trajectory is identified across previously written tracks on a surface of a machine-readable medium for a read-write head to move along and build up velocity. Identifying the trajectory includes identifying one of the previously written tracks as a launch location from which to launch the read-write head. Identifying the trajectory also includes identifying a start writing location near a blank region of the surface of the machine-readable medium at which to turn on a write gate. A current is applied to the read-write head to cause the read-write head to move along the trajectory. In addition, the identified launch location is adjusted until a target velocity is obtained at the start writing location.

42 Claims, 11 Drawing Sheets

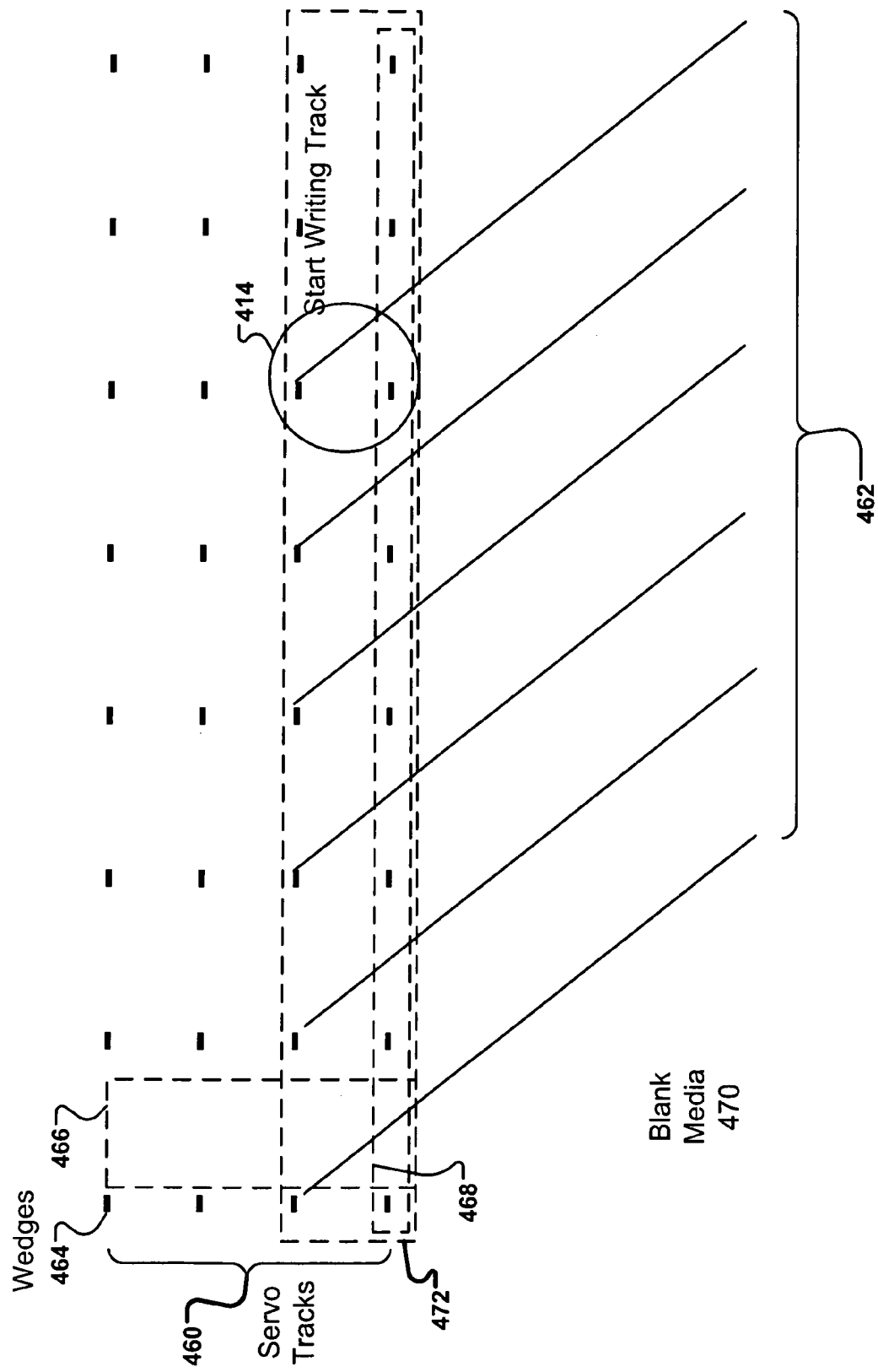

METHOD TO WRITE RAMP-TRACK

CROSS REFERENCE TO RELATED APPLICATIONS

This application claims the benefit of the priority of U.S. Provisional Application Ser. No. 60/965,397, filed Aug. 20, 2007 and entitled "A Method to Write Ramp-Track Spirals".

BACKGROUND

The present disclosure describes systems and techniques relating to recording data on a computer readable medium.

In magnetic-medium-based storage devices, data can be stored on circular, concentric tracks on a magnetic disk surface. A read-write head can retrieve and record data on a magnetic layer of a rotating disk as the head flies on a cushion of air over the disk surface. When retrieving data, magnetic field variations can be converted into an analog electrical signal, which can then be amplified and converted to a digital signal for signal processing. To guarantee the quality of the information stored on and read back from the disk, the read-write head should to be precisely positioned at substantially the center of a track during both writing and reading. A closed-loop servo system, driven by servo information embedded in a dedicated portion of the track, can be used as a reference for positioning the head.

The servo information generally defines the position of the data tracks and is generally written with great accuracy to ensure that the head servo system operates properly. The servo information can be written on each surface as a radially extending set of spokes or wedges. The portion of a servo wedge at a particular track location may contain a sync field, an index mark, a gray coded track number, and two or more fine-positioned offset bursts configured in an echelon across the track. Head positioning relative to a track center can be determined and corrected, if necessary, by reading and noting the respective amplitudes and timings of the offset bursts.

Conventionally, a servo writer is used to write the embedded servo information on the disk surface. A servo writer can include a large base (e.g., granite base) to minimize the effects of vibration. The servo writer also may use precision fixtures to hold the target drive, a precision, laser-interferometer-based actuator arm positioning mechanism to place the arms radially with respect to the axis of rotation of the disks in the drive, and an external clock head to position the servo wedges in time. Conventional servo writers are typically large in size and expensive. Further, as track density increases, the servo writing time required by a servo writer to write the servo information also increases, which can create a bottleneck in the disk drive manufacturing process.

Various attempts have been made to reduce usage of such servo writers. For example, some servo writing techniques have used a servo writer to generate high quality seed wedges, from which additional servo wedges can be generated by the disk drive itself using propagation self-servo write techniques. Other approaches have tried to eliminate the traditional servo writer altogether by pre-writing the disk with a low frequency reference pattern. Yet another approach has been to attempt an increase in throughput per servo writer by writing a spiral servo pattern on the disk, from which server wedges can be generated by the disk drive itself.

SUMMARY

The present disclosure includes systems and techniques relating to writing ramp tracks on a computer readable medium. According to an aspect of the described systems and techniques, a method includes identifying a trajectory across previously written tracks on a surface of a machine-readable medium for a read-write head to move along and build up velocity. Identifying the trajectory includes identifying one of the previously written tracks as a launch location from which to launch the read-write head. Identifying the trajectory also includes identifying a start writing location near a blank region of the surface of the machine-readable medium at which to turn on a write gate. A current is applied to a positioning device associated with the read-write head to cause the read-write head to move along the trajectory. In addition, the identified launch location is adjusted until a target velocity is obtained at the start writing location.

Implementations can optionally include one or more of the following features. For example, a distance traveled by the read-write head to obtain the target velocity can be detected, and the identified launch location can be adjusted based on the detected distance. Adjusting the identified launch location can include adjusting a radial position associated with a track number and an angular position associated with a wedge number.

Also, implementations can optionally include one or more of the following features. The write gate on the read-write head can be turned on for a period of time to begin a write session when the read-write head reaches the start writing location at the target velocity. Another current can be applied to reverse a trajectory of the read-write head. In addition, the read-write head can be controlled to track one of the previously written tracks different from the launch location in preparation for a next write session. Further, the applied other current can be adjusted based on the read-write head detecting the one of the previously written tracks. The other current can be applied at an end of the period of time for turning on the write gate.

In addition, implementations can optionally include one or more of the following features. The applied other current can be applied to cause the read-write head to obtain a velocity needed to detect one of the previously written tracks. The applied other current can be adjusted based on a detected time period for applying the other current and detecting one of the previously written tracks. Identifying the trajectory can include test launching the read-write head at least once until the read-write head moves along the trajectory at the target velocity. Adjusting the identified launch location can include, based on the test launching, adjusting the identified launch location until the read-write head moves at the target velocity at the start writing location. Test launching the read-write head can include applying a seek-by-dragging process that includes launching the read-write head from the launch location and dragging a target ahead of the read-write gate across the previously written tracks for the read-write head to seek. The seek-by-dragging process also includes adjusting the applied current to cause the launched read-write head to seek the dragged target by accelerating along the trajectory until obtaining the target velocity. The seek-by-dragging process can be repeated until the target velocity is obtained. The read read-write head can be launched from the adjusted launch location. Also, detection can be made on whether the read-write head arrives at the start writing location at the target velocity. Detecting whether the read-write head arrives at the start writing location at the target velocity can include applying a seek-by-dragging process. The seek-by-dragging process includes launching the read-write head from the adjusted launch location; dragging a target ahead of the read-write head along the identified trajectory for the read-write head to seek; and adjusting the applied current to cause the launched read-write head to seek the dragged target by accelerating along the trajectory until obtaining the target velocity at the start writing location.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer readable medium, or method. Similarly, method implementations can be realized from a disclosed system, computer-readable medium, or apparatus, and system implementations can be realized from a disclosed method, computer-readable medium, or apparatus.

Thus, according to another aspect of the described systems and techniques, a system can include a head-disk assembly that includes a transducer including a read-write head having a write gate; a spindle for rotating a machine-readable medium; and a control unit connected with the head-disk assembly. The control unit is configured to cause the head-disk assembly to perform operations including identifying a trajectory across previously written tracks on a surface of the machine-readable medium for the read-write head to move along and build up velocity. Identifying the trajectory by the control unit includes identifying one of the previously written tracks as a launch location from which to launch the read-write head, and identifying a start writing location near a blank region of the machine-readable medium at which to turn on a write gate. The control unit also applies a current to the positioning device connected to the read-write head to cause the read-write head to move along the trajectory. In addition, the control unit adjusts the identified launch location until the read-write head obtains a target velocity at the write location.

Implementations can optionally include one or more of the following features. Adjusting the identified launch location can include detecting a distance traveled by the read-write head to obtain the target velocity; and adjusting the identified launch location based on the detected distance.

Operations can include turning on the write gate on the read-write head for a period of time to begin a write session when the read-write head reaches the start writing location at the target velocity. Also, the operations can include applying another current to reverse a trajectory of the read-write head. In addition, operations can include controlling the read-write head to track one of the previously written tracks different from the launch location in preparation for a next write session. Further, operations can include adjusting the applied other current based on the read-write head detecting the one of the previously written tracks. Operations can include applying the other current at an end of the period of time for turning on the write gate. Operations can include adjusting the applied other current to cause the read-write head to obtain a velocity needed to detect one of the previously written tracks. In addition, operations can include adjusting the applied other current based on a detected time period for applying the other current and detecting one of the previously written tracks.

Also, implementations can optionally include one or more of the following features. Adjusting the identified launch location can include adjusting a radial position associated with a track number and an angular position associated with a wedge number. Also, identifying the trajectory can include test launching the read-write head at least once until the read-write head moves along the trajectory at the target velocity. Further, adjusting the identified launch location can include based on the test launching, adjusting the identified launch location until the read-write head moves at the target velocity at the start writing location. Test launching the read-write head can include applying a seek-by-dragging process that includes launching the read-write head from the launch location. The seek-by-dragging process also includes dragging a target ahead of the read-write gate across the previously written tracks for the read-write head to seek; and adjusting the applied current to cause the launched read-write head to seek the dragged target by accelerating along the trajectory until obtaining the target velocity. The control unit can be configured to repeat the seek-by-dragging process until the target velocity is obtained. The read read-write head can be launched from the adjusted launch location. Also, the control unit can detect whether the read-write head arrives at the start writing location at the target velocity. Detecting whether the read-write head arrives at the start writing location at the target velocity can include applying a seek-by-dragging process. The seek-by-dragging process includes launching the read-write head from the adjusted launch location; dragging a target ahead of the read-write head along the identified trajectory for the read-write head to seek; and adjusting the applied current to cause the launched read-write head to seek the dragged target by accelerating along the trajectory until obtaining the target velocity at the start writing location.

The described systems and techniques can potentially result in various advantages. For example, a read-write head of a disk drive can be controlled to consistently obtain a target velocity at a target start writing location. Such consistency in controlling the read-write head can provide a repeatable write session with repeatable ramp-tracks.

Details of one or more implementations are set forth in the accompanying drawings and the description below. Other features and advantages may be apparent from the description and drawings, and from the claims.

DRAWING DESCRIPTIONS

Figure 4A:
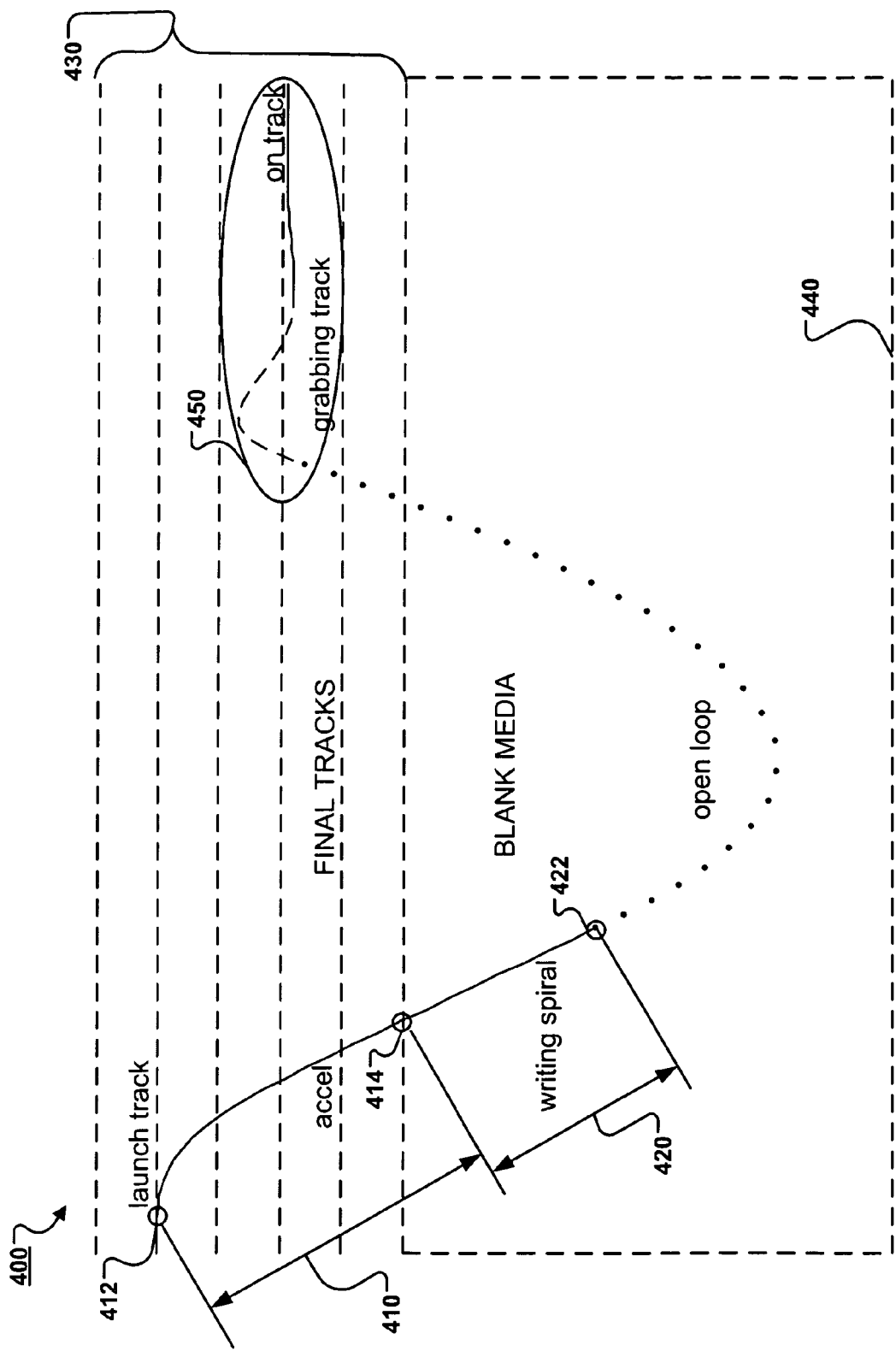

FIG. 4*a* is a diagram showing an example surface of a computer readable medium.

FIG. 4*b* is a diagram showing an example start writing location on a surface of a computer readable medium.

Figure 5:
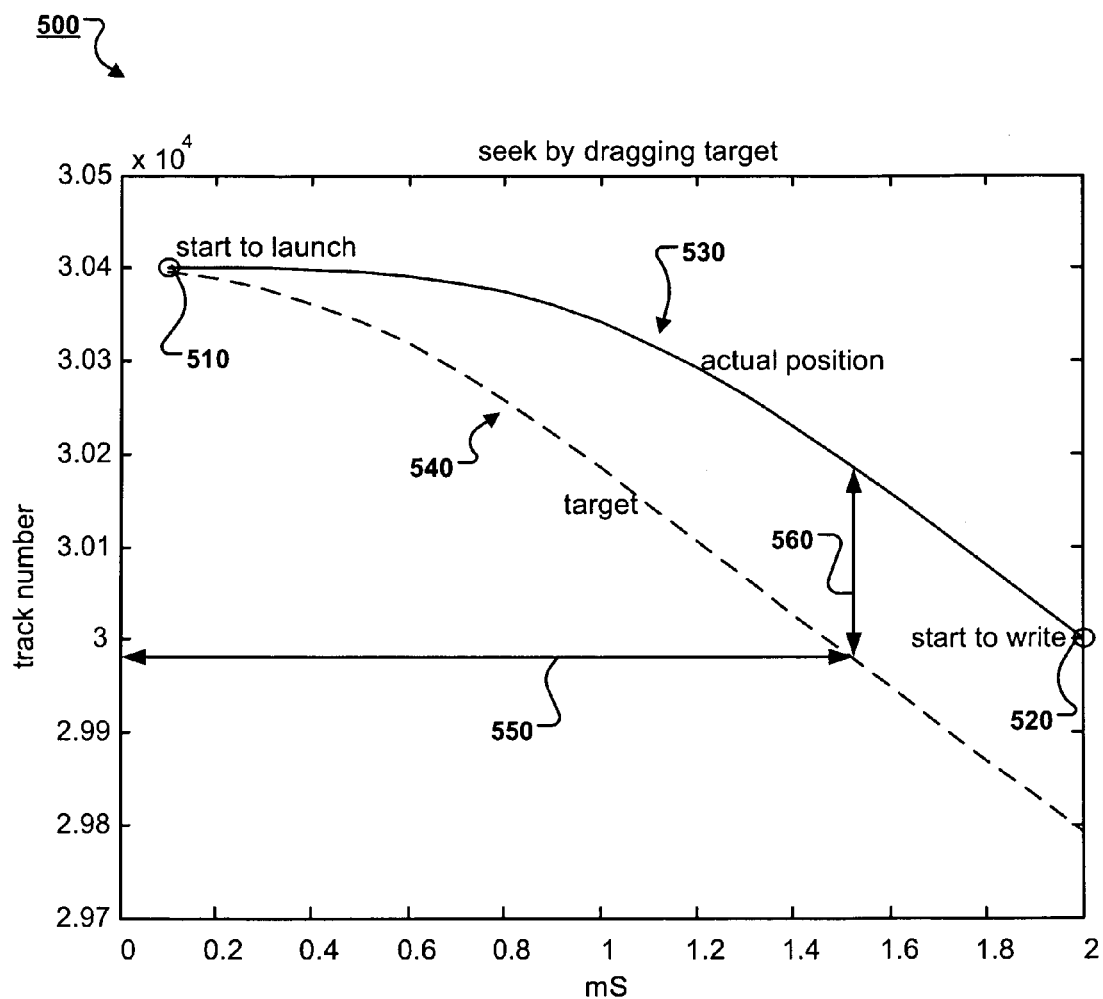

FIG. 5 is a diagram showing an example movement of a read-write head.

Figure 6:
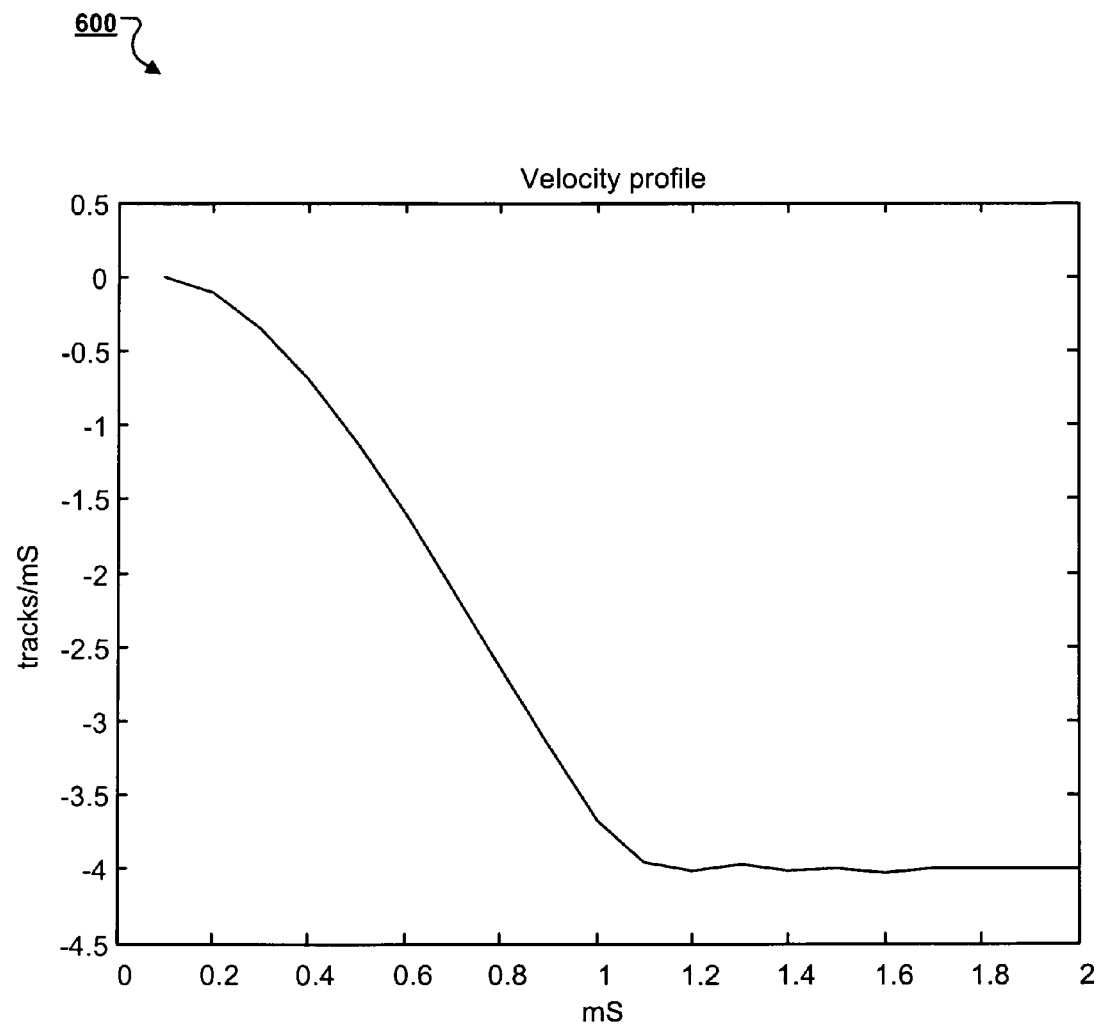

FIG. 6 is a diagram showing changes in velocity of a read-write head as a function of time.

Figure 7:
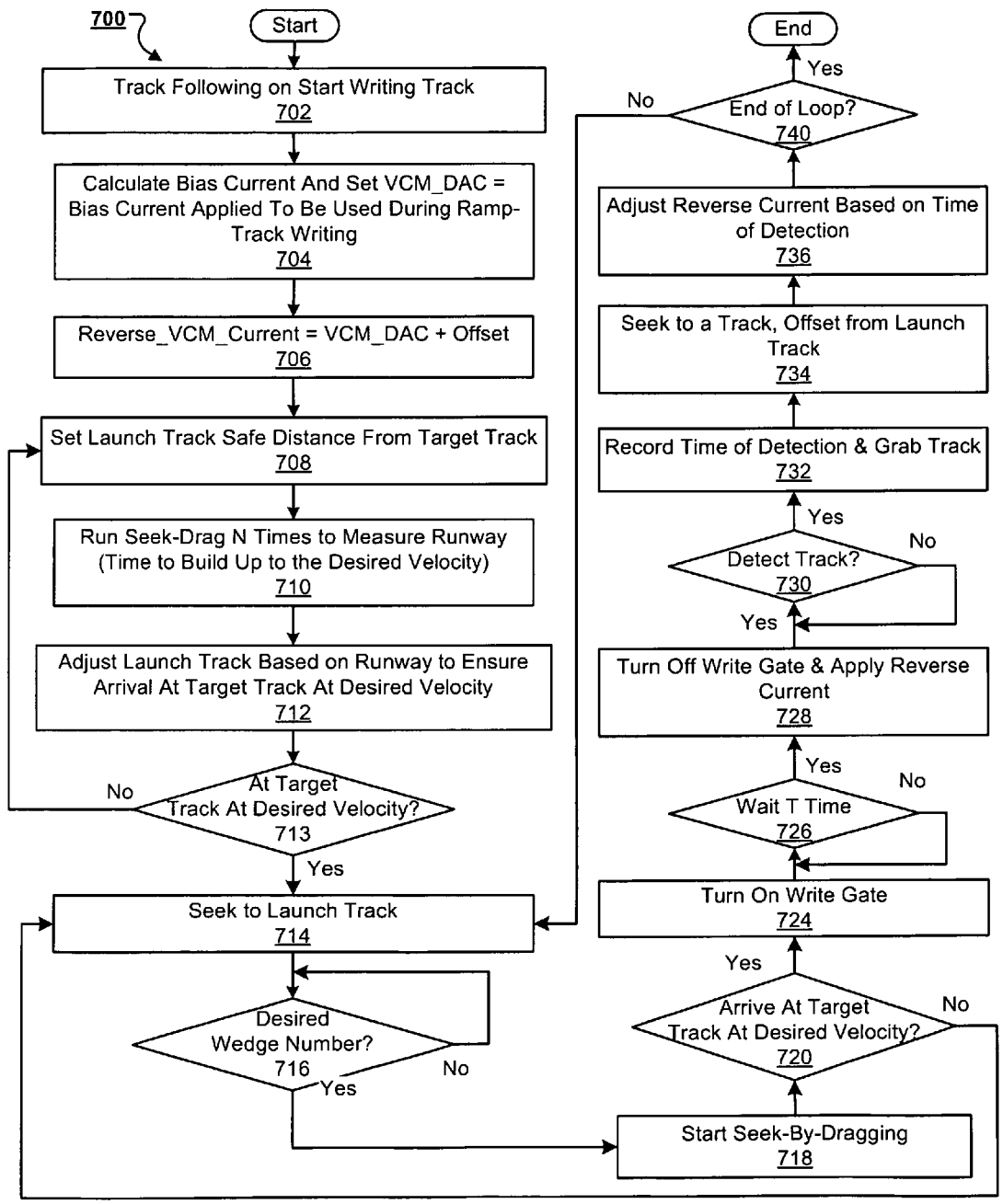

FIG. 7 is a process flow diagram showing another example process for controlling a read-write head.

Figure 8B:
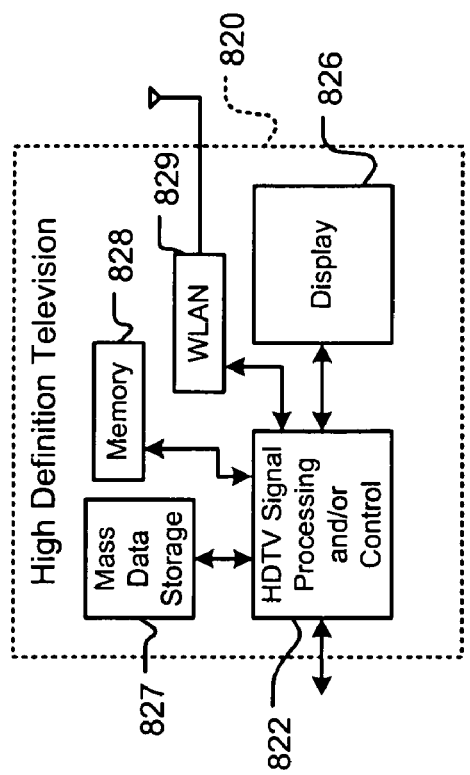
Figure 8A:
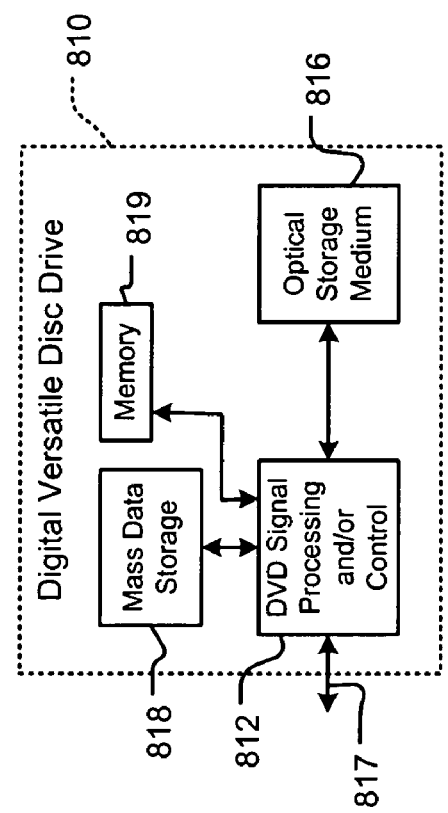

FIG. 8A is a block diagram showing an example implementation in a digital versatile disk (DVD) drive.

FIG. 8B is a block diagram showing an example implementation in a high definition television (HDTV).

Figure 8D:
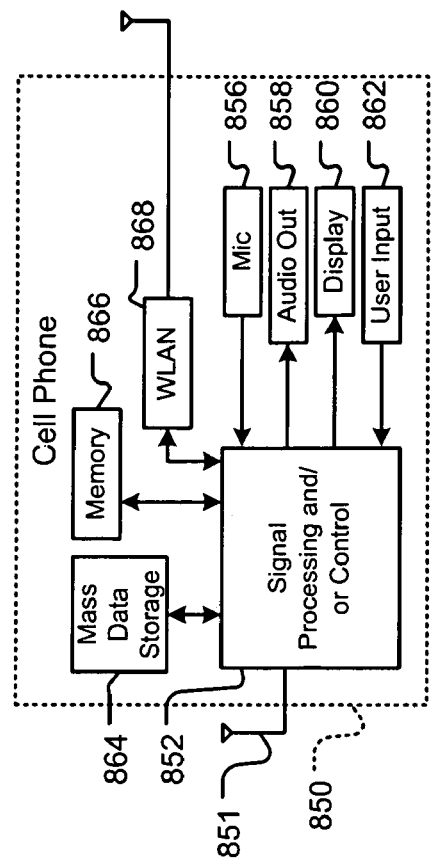
Figure 8C:
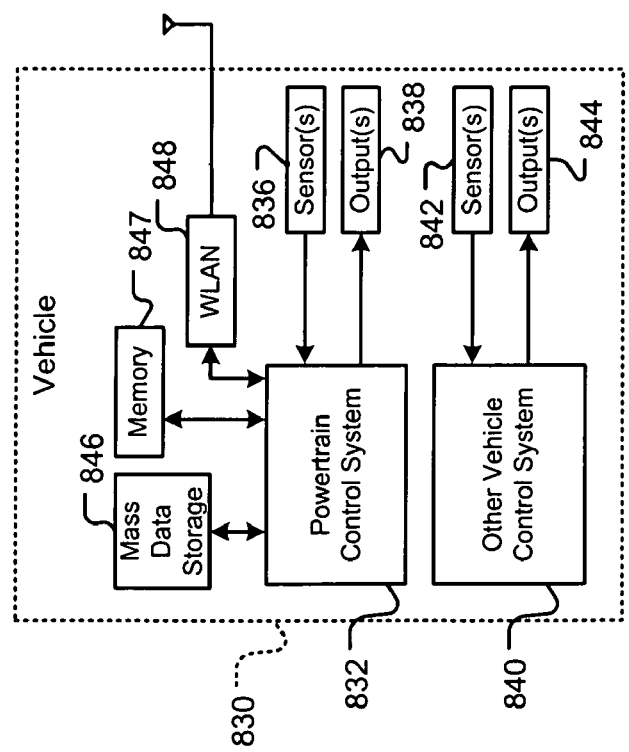

FIG. 8C is a block diagram showing an example implementation in a control system of a vehicle.

FIG. 8D is a block diagram showing an example implementation in a cellular phone.

Figure 8E:
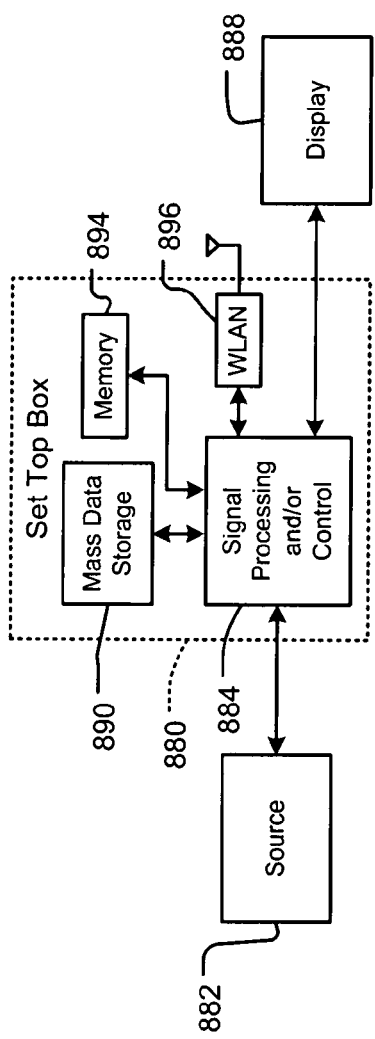

FIG. 8E is a block diagram showing an example implementation in a set top box.

Figure 8F:
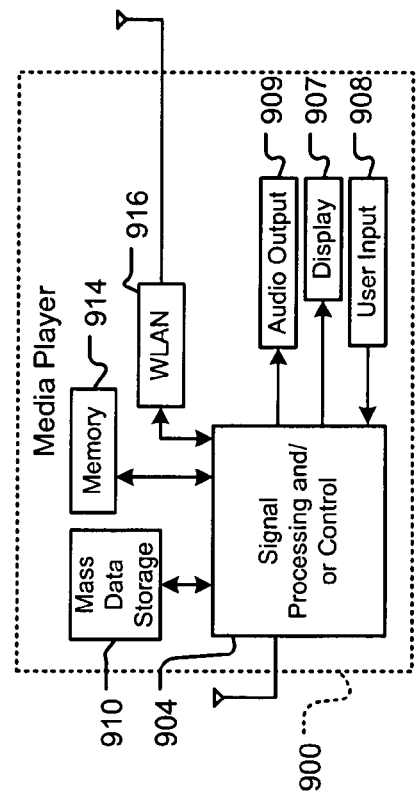

FIG. 8F is a block diagram showing an example implementation in a media player.

Like reference symbols in the various drawings indicate like elements.

DETAILED DESCRIPTION

The systems and techniques described herein can be implemented as one or more devices, such as one or more integrated circuit (IC) devices (e.g., a compact disk driver, a digital versatile disk driver, etc.) For example, the systems and techniques described in this specification can be implemented to write ramp tracks on a computer readable medium. In writing the ramp tracks, the systems and techniques described in this specification can be used to move a read-write head at a target velocity at a target start writing location.

Figure 1:
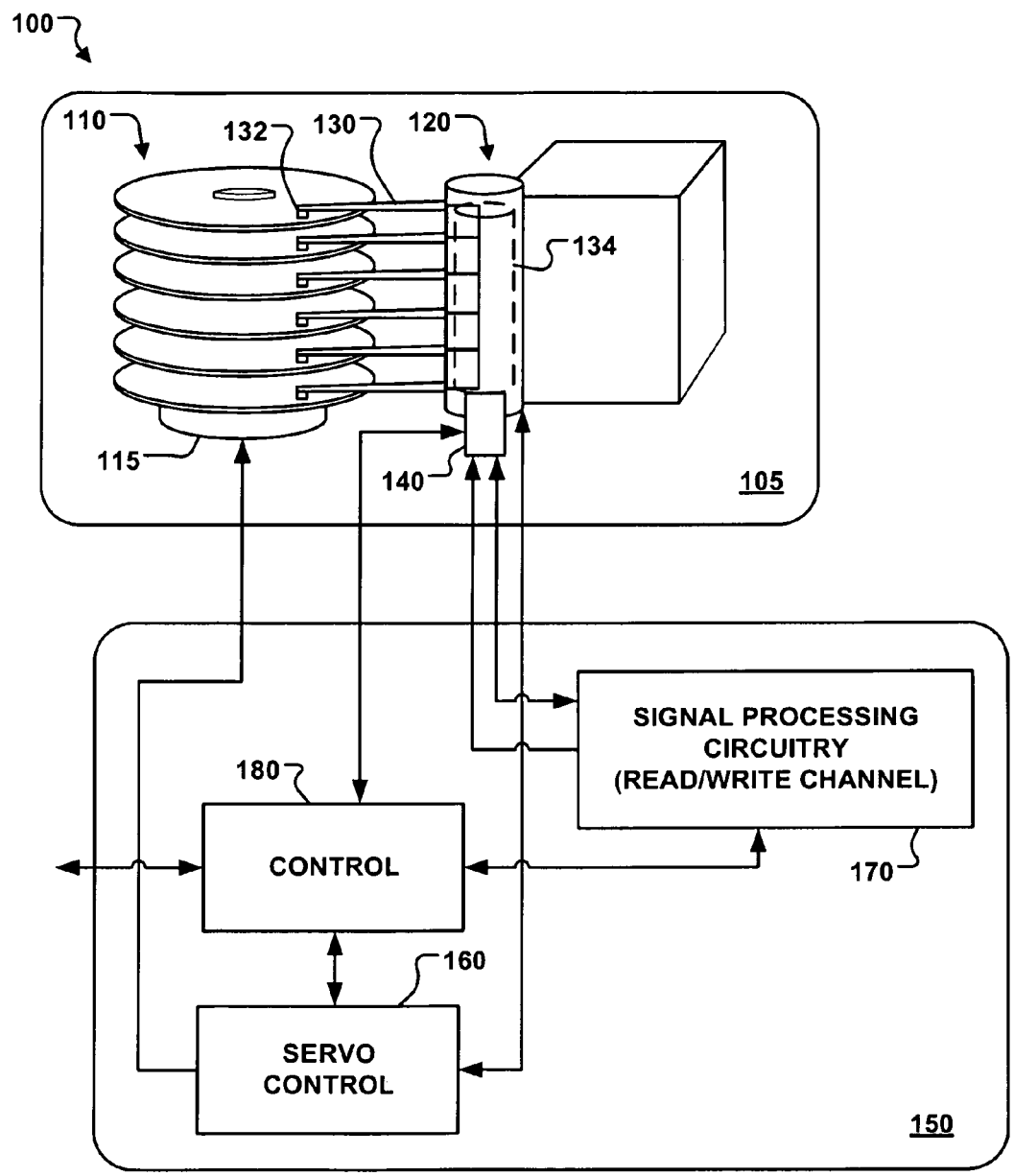
FIG. 1 is a block diagram showing an example system for writing ramp-tracks.

FIG. 1 is a block diagram showing an example system 100 that employs self-servo-write using ramp-tracks. The system 100 can be implemented as a disk drive used to write the ramp-tracks as described in this specification. The system 100 includes a head-disk assembly (HDA) 105 and drive electronics 150 (e.g., a printed circuit board assembly (PCBA) with semiconductor devices). The HDA 105 includes one or more disks 110 mounted on an integrated spindle and motor assembly 115. The spindle and motor assembly 115 rotates the disk(s) 110 under read-write head(s) 132 connected with a head assembly 120 in the HDA 105. The disk(s) 110 can be coated with a magnetically hard material (e.g., a particulate surface or a thin-film surface) and can be written to, or read from, a single side or both sides of each disk 110. Examples of the disks 110 include computer or machine readable mediums such as digital versatile disks (DVDs), DVD recordable format (DVD-R), DVD rewritable format (DVD-RW), high definition DVD (HD-DVD), compact disks (CDs), etc.

A read-write head 132 on an arm 130 can be positioned as needed to read data on a disk 110. A positioning device 134, such as a voice coil motor (VCM), can be used to position the read-write head 132 over a desired track. The positioning device 134 can be located within HDA 105, such as in connection with the head assembly 120. The arm 130 can be a pivoting or sliding arm and can be spring-loaded to maintain a proper flying height for the read-write head 132 in any drive orientation. A closed-loop head positioning system can be used.

The HDA 105 can include a preamp/writer 140, where head selection and sense current value(s) can be set. The preamp/writer 140 can amplify a read signal before outputting the read signal to signal processing circuitry 170. The signal processing circuitry 170 can include a read signal circuit, a servo signal processing circuit, and a write signal circuit.

Signals between the HDA 105 and the drive electronics 150 can be carried through a flexible printed cable. A controller 180 can direct a servo controller 160 to control mechanical operations, such as head positioning through the head assembly 120 and rotational velocity control through the motor assembly 115. The controller 180 can be one or more IC chips (e.g., a combo chip), which can include read-write channel signal processing circuitry 170. The controller 180 can be a microprocessor and a hard disk controller. The drive electronics 150 can also include various interfaces, such as a host-bus interface, and memory devices, such as a read only memory (ROM) for use by a microprocessor, and a random access memory (RAM) for use by a hard disk controller. The read-write channel 170 can include error correction circuitry.

The system 100 includes a self-servo-write controller that causes servo information to be written on the machine-readable medium as described. The self-servo-write controller can be integrated into a device, such as a read-write channel transceiver device (e.g., the read-write channel signal processing unit 170) suitable for use in a magnetic recording system. The self-servo-write controller can be composed of multiple sets of coordinating circuitry and can be integrated with the components described above or organized into a separate component of a disk drive. For example, the self-servo-write controller can be integrated into the controllers 160, 180, the read-write channel signal processing circuitry 170, the preamp/writer 140, or various combinations of these components (e.g., the components 160, 170, 180 can all be combined into a single integrated circuit).

Figure 2:
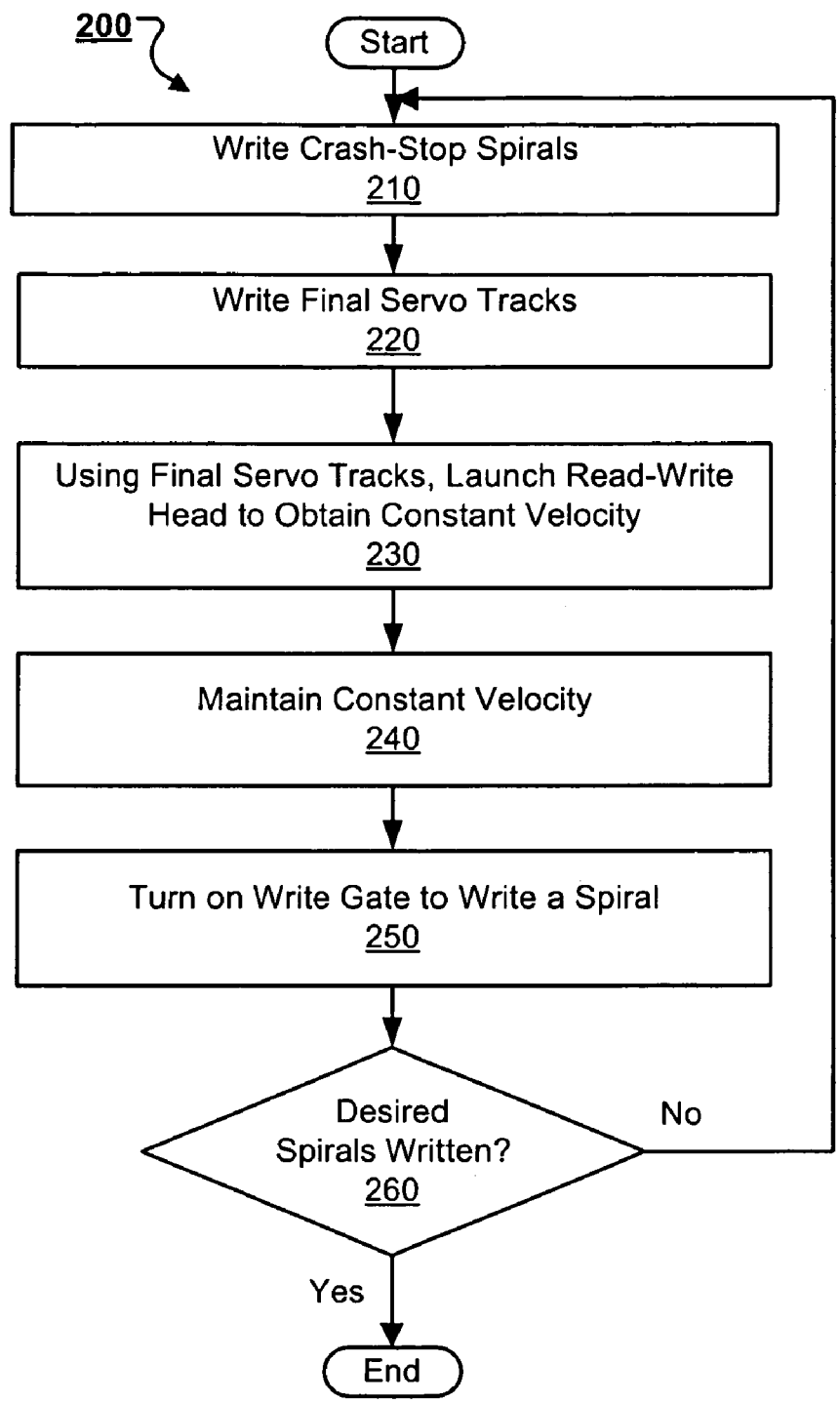
FIG. 2 is a process flow diagram showing an example process for writing ramp-tracks.

FIG. 2 shows an example process 200 for using a system (e.g., system 100) as described in this specification to write ramp-tracks on a computer readable medium. The system writes a crash-stop or hard-stop position of a predetermined length on a computer readable medium (block 210. The hard-stop position is used to seed the rest of the ramp-track writing process. The hard-stop position represents a first band of a servo wedge in the computer readable medium. The initial hard stop position can be near the inner diameter (ID) of the computer readable medium, for example. Also, the initial hard stop position can be near the outer diameter (OD) of the computer readable medium.

The system writes final servo tracks on the surface of the computer readable medium (block 220) to complete a first final band by track following on the crash-stop or hard-stop position. Using the final servo tracks, the system launches a read-write head from the first final band to accelerate the read-write head until a constant velocity is reached (block 230). The system controls the read-write head to maintain the reached constant velocity (block 240) and turns on a write gate to start writing a ramp track (block 250). When the write gate is turned on to write the ramp track, the system positions the read-write head at a start writing location near a blank region of the surface of the computer readable medium. The system repeats this process 200 to write as many ramp tracks as desired (block 260). Once the ramp tracks have been written, a new band of ramp tracks are obtained. The system uses the new band of ramp tracks to write the final servo tracks. Then the system uses the newly written band of final servo tracks to write the next band of ramp tracks.

Each set of ramp-tracks may not extend all the way to the other side of the computer readable medium. For example, each set of ramp-tracks may span less than half, less than third, less than fourth, or less than eighth a distance from an inner diameter to an outer diameter of the machine-readable medium. In general, the dimensions of the ramp-tracks used can be inversely proportional to the tolerance of the VCM control. For example, if the VCM control and spindle have a tolerance of 1%, then the ramp-tracks can span a distance of about one hundred final servo tracks. In general, the span of a set of ramp-tracks can be less than or equal to one thousand final servo tracks, less than or equal to one hundred final servo tracks, or in the range of three to ninety final servo tracks.

The first set of ramp-tracks can be used to provide the position and timing reference used for self-servo-writing of a small band of final servo tracks and wedges. The servo-wedges written in this way cover a radial range spanned by the ramp-track zone. Then another set of reference ramps can be written, with starting radius located on one of the written servo tracks to serve as the bootstrapped position. This second set of reference ramps can then be used to extend the written servo tracks further to the outer edge of the new ramps. This process can be continued until the whole disk is written with final servo tracks.

In order to write a ramp-track, three conditions need to be met at a point where the read-write head starts to write: (1) the read-write head should move at the right velocity; (2) the read-write head should be on the right track; and (3) the disk, which is constantly rotating should be at the right angle to compare with an index. As the disk rotates, the disk crosses the index once per revolution. Launching the read-write head describes an action to start moving the read-write head from zero velocity (i.e., from track following mode.) In addition, the track number is associated with a radial position, and a wedge number is associated with an angular position on the surface of the computer-readable medium.

Figure 3:
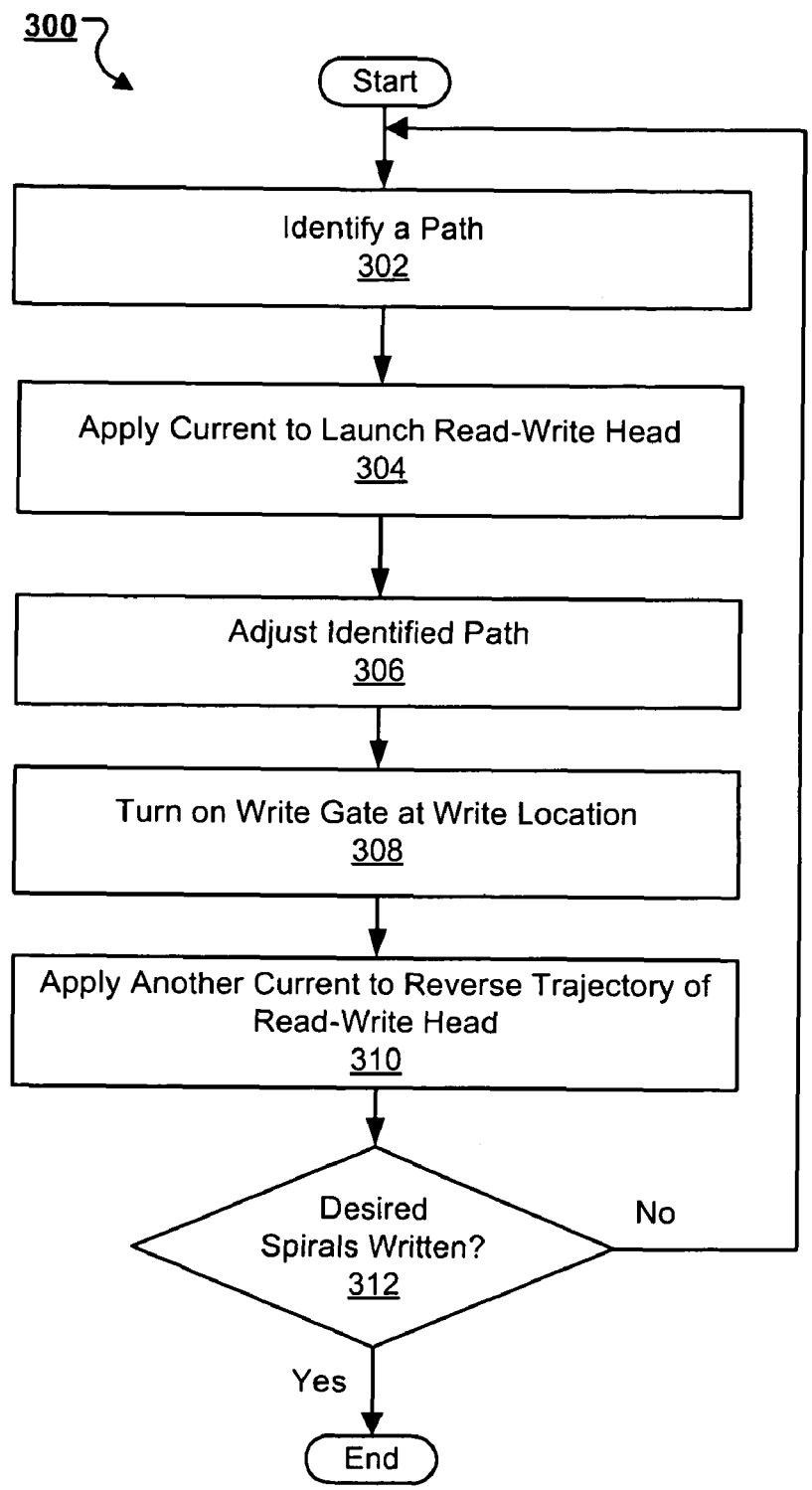
FIG. 3 is a process flow diagram showing an example process for controlling a read-write head.

FIG. 3 shows an example process 300 for controlling the read-write head when writing ramp-tracks. To write a ramp-track from a target track, the system (e.g., system 100) controls the read-write head to cross the target track at a desired target velocity. To obtain and maintain the target velocity, the system applies a constant current to counter the sum of all torques acting against the read-write head.

To build up to the desired target velocity to start a write session, a trajectory such as a runway is identified (block 302). The trajectory includes a launch location and a start writing location. The read-write head performs track following at the launch location and until commanded to move radially toward the start writing location. A start writing location is defined as a track number and an offset angle from the index mark. The read-write head moves in the blank region and, with the write gate on, writes a ramp-track. The launch location can be one of the previously written tracks (e.g., final servo tracks) to launch the read-write head. The launch location is set at a safe distance away from the start writing location to enable the read-write head to build up to the desired target velocity. The start writing location can be near a blank region on a surface of the computer readable medium at which to turn on the write gate and launch writing ramp-tracks.

A current is applied to launch the read-write head and move the read-write head along the trajectory (block 304). The current applied can be for example, a VCM current applied to a motor attached to the read-write head, such as the VCM. The VCM current includes an appropriate current level to drive the read-write head until the target velocity is obtained. To apply the appropriate VCM current to the actuator, the appropriate VCM current to obtain the target velocity is determined.

In addition to determining the appropriate VCM current, the system adjusts the identified trajectory until the target velocity is obtained at the start writing location (block 306). Adjusting the identified trajectory includes adjusting the launch location of the identified trajectory to obtain the desired velocity when the head crosses the start writing track. Also, the launch location for launching the read-write head can be calculated so that the read write head arrives at the start writing track at the desired velocity and desired offset angle.

Adjusting the identified launch location can include detecting a distance traveled by the read-write head to obtain the target velocity. Then, the identified launch location can be adjusted based on the detected distance. Adjusting the identified launch location can include detecting a velocity of the read-write head at the identified start writing location. The identified launch location can be adjusted based on the detected velocity at the start writing track being different from the target velocity. Further, adjusting the identified launch location can include detecting a time period for the read-write head to reach the identified start writing location. The identified launch location can be adjusted based on the detected time period being different from a target time period associated with a target velocity.

The system turns on a write gate on the read-write head for a period of time to begin a write session when the read-write head reaches the start writing location at the target velocity (block 308). Once the write gate is turned off, another current is applied to reverse a trajectory of the read-write head (block 310).

The other current applied can be a reversal VCM current determined to reverse the trajectory of the actuator that controls the read-write head and return the read-write head to the final servo tracks area. The reversal VCM current is a current different from the VCM current that can be applied after the write session to reverse the trajectory of the read-write head back towards the final servo tracks. The process can be repeated until a desired number of ramp tracks are written (block 312).

FIG. 4a is a diagram showing an example surface 400 of a computer readable medium. The surface 400 of the computer readable medium includes final servo tracks 430, which are previously written tracks. A system (e.g., system 100) identifies a trajectory 410 across the final servo tracks 430. The identified trajectory 410 includes a launch position 412 from which the read-write head is launched. As described with respect to FIG. 3, the system applies current to launch the read-write head until a target velocity is obtained at a target start writing location or position. The applied current includes a time varying current based on received feedback received from track information.

The identified trajectory 410 also includes the start writing position 414 near a blank region 440 of the surface 400 of the computer readable medium at which the system turns on a write gate of the read-write head to start a write session. During the write session, the write gate is turned on for a period of time while the read-write head continues to move across the blank region 440 of the surface of the computer readable medium. When the write gate is turned off, a ramp-track is written and a write trajectory 420 is traced by the read-write head.

At one end 422 of the write trajectory 420, the system turns off the write gate and applies another current different from the current that launched the read-write head. This applied other current can be a constant current applied to reverse the direction of movement of the read-write head from 422 to 450. The applied other current is used to reverse a trajectory of the read-write head and move it back towards the final servo tracks 430. Upon detecting a track, the system 100 adjusts the other current to enable the read-write head to track one of the final servo tracks (e.g., track 450). The other current can be pre-adjusted for the next launch based on the current time period from applying the other current. The pre-adjusted current is applied at the end of the writing period of the next ramp-track writing.

The identified trajectory 410 can be adjusted by applying a seek-by-dragging process until the read-write head achieves a ready state. The ready state represents the read-write head arriving at the start writing location 414 with the target velocity.

The seek-by-dragging process includes two basic modes: (1) a track following mode when the read-write head is at a target and (2) a seek mode when the read-write head is away from the target. Also, the velocity of the read-write head can be limited to a predetermined maximum value.

The seek mode includes seeking to a desired velocity by dragging a target in front of the read-write head and having the read-write head seek the dragged target. Because the read-write head cannot instantaneously achieve the target velocity, the read-write head eventually moves at the desired target velocity after seeking for a period of time. The seek-by-dragging process is repeated until the read-write head consistently achieves the target velocity at the start writing location. By using the seek-by-dragging process, the number of tracks traveled by the read-write head is kept consistent, and the read-write head moves at the desired velocity at the desired track (e.g., the start writing location).

FIG. 4b is a diagram showing an example start writing location on a surface of a computer readable medium. The dashed lines 460 represent previously written servo tracks. For illustrative purposes, circular shapes of the server tracks have been flatten out as the dashed horizontal lines. Also, a ramp track is represented as a solid line 462 having a slope. The dashed horizontal lines 460 that represent the servo tracks include wedges 464 represented as dashes Data are written to the blank spaces 466 between the dashes that have no data beforehand. The lowest line 468 corresponds to the last servo track. Under the last servo track is the blank media 470.

The start writing location 414 is near and outside of the blank media 470. This location near the blank media encompasses some of the servo tracks. For example, the start writing location 414 for writing the ramp tracks 462 can be located approximately 20 tracks up from the blank media. This includes an area 472 where the servo tracks and ramp tracks overlap. For illustrative purposes, only 2 lines of servo tracks are used to represent the overlapped area 472. However, the overlapped area 472 can include a range of tracks, such as between 5 and 20 (including 5 and 20). The overlapped area 472 is used to allow the read-write head to switch from the normal servo tracks to the ramp tracks. For example, when inside the overlapped area, the read-write head can track follow using the servo tracks or the ramp tracks. After writing the ramp tracks in a portion of the blank media, the read-write head is moved back to the servo tracks area. In the servo tracks area, control of the read-write head is switched to use the servo tracks and seek to the overlapped area. Once in the overlapped area, control of the read-write head is switched to use the ramp tracks and stepped outside the overlapped area.

For a normal servo, when seeking from a launch track, where the read-write head is track following, to a target track, the system sets the target track in the servo code. The system starts a seek mode and moves the read-write head to the launch track. When seeking to the target track, the system can achieve and maintain a constant velocity by establishing the target track and then continuously modifying the target track to a new value until the constant velocity is achieved.

This seek-by-dragging process is akin to dragging a carrot in front of a horse. Just as the horse moves in an attempt to catch the carrot, the read-write head moves toward the target. When the target achieves a velocity equal to the desired velocity, the read-write head is maintained at that same velocity.

The seek-by-dragging process allows the read-write head to move across a desired track at a desired velocity with a desired accuracy for writing ramp-tracks. Also the times can be recorded at which positional measurements are made when the read-write head is over the wedge. Based on these positional measurements, the control current can be adjusted to keep the read-write head track following or target seeking.

FIG. 5 is a diagram showing an example movement 500 of the read-write head during the seek-by-dragging process. The movement 500 of the read-write head is shown using the tracks traveled (y-axis) as a function of time (x-axis). A first data point 510 represents a track number (e.g., launch location) from which the read-write head is launched. The movement 500 of the read-write head traces an actual position 530 of the read-write head as a function of time. The diagram also shows a time dependent position 540 of a target being dragged in front of the read-write head. The target is a value given to the code to indicate where the read-write head should go. Thus, the target is not a physical quantity. The value given to the code can be a fixed number or a variable number that is changed to obtain the constant velocity starting at a desired location.

As described above, because the read-write head cannot instantaneously achieve the target velocity, a time period 550 is required before the target velocity is achieved. This time period or delay, appropriate to accelerate the read-write head until the target velocity is achieved, causes the read-write head to be off target. Thus, a gap or a positional difference 560 is created between the position 530 of the seeking read-write head and the position 540 of the dragged target. By the time the read-write head achieves the target velocity, the gap 560 has been stabilized.

The seek-by-dragging process is repeated until the read-write head achieves the target velocity at the start writing location. The start writing location is represented in FIG. 5 as a track number 520 (e.g., the start writing location) at which to turn on the write gate and write the ramp-track. The launch location 510 is adjusted each time the seek-by-dragging process is repeated until the read-write head achieves the target velocity at the start writing location.

FIG. 6 is a diagram showing an example velocity profile 600 for a read-write head. The y-axis represents the velocity of the read-write head in units of tracks per millisecond (tracks/ms). The x-axis represents time in ms. As described with respect to FIG. 5 above, the read-write head needs time to accelerate until the target velocity is obtained. The velocity profile 600 shows an increase in the magnitude of the velocity (in units of tracks/ms) of the read-write head before the target velocity is obtained.

The velocity is shown as negative values to indicate that the read-write head moves from a high track number to a lower track number. In other words, the read-write head moves from an inner portion of the disk toward an outer portion of the disk. The outer portion has a lower track number than the inner portion of the disk. Once the target velocity is obtained, the target velocity is maintained.

After finishing writing a ramp-track, the system applies another VCM current, different from the VCM current that launched the read-write head, to turn the read-write head around toward the original final servo track area. The other VCM current or a reverse VCM current is adjusted to return the read-write head to the original final servo track area at a velocity that is within an acceptable range.

For example, too much current may prevent the read-write head from being able to detect and track one of the final servo tracks. Alternatively, not enough current may cause the read-write head to just float out of the area where the final servo tracks exist. To evaluate the return trajectory of the read-write head, a time period from starting the reverse VCM current to the read write head returning to the final servo tracks area can be detected. The reverse VCM current is adjusted until the detected time period matches a target time period required for the read-write head to track one of the final servo tracks.

The VCM current used to maintain a constant velocity is obtained by averaging the current applied to the VCM to cause the read-write head to perform track-following at the start writing track. To perform track-following, a small change in current is applied at every wedge based on received feedback obtained from tracks information until the read-write head reaches the start writing track. At this point, the current is held constant during the actual writing process. The constant current is calculated using the seek-by-dragging process 710. The average value is called bias current because the current is used to counter (i.e. bias) against the external torques (such as windage and cable) applied on the VCM. To maintain constant velocity, the VCM should overcome these torques and let the momentum sustain the movement.

The other current used to reverse the motion of the read-write head is first calculated by offsetting the VCM current by an amount determined by a priori knowledge of the drive (e.g., by measuring some drives to obtain a general idea about what should work but not necessarily optimized). After each launch of the read-write head, the value of the other current is pre-adjusted by measuring a time duration for the read-write head to do a complete reversal up to track-following. When the system detects that the time duration is too long, the system determines that there is not enough current to bring back the read-write head. When the system detects that the time duration is too short, then there is too much current applied. This process is repeated and eventually converged to an optimized number for the other current.

FIG. 7 is a process flow diagram showing another example process 700 for controlling the read-write head to write ramp-tracks. A system (e.g., system 100) prepares a read-write head (e.g., read-write head 132) to start a write session. The system controls the read-write head to follow one of the previously written tracks (e.g., final servo tracks) on the desired final wedge (block 702). At this stage, a write gate on the read-write head is not yet turned on. The system pre-determines a VCM current appropriate to maintain the read-write head at constant velocity during writing (block 704). One way to accomplish this is to use the average current needed to maintain track-following at the start writing location. During the writing time, this current is used to counter the external torques while momentum keeps the read-write head moving at a constant velocity to cover the short distance of a ramp-track.

In addition, the system can determine a reverse current to reverse a trajectory of the read-write head by setting Reverse_VCM_Current=VCM_DAC+Offset, for example (block 706). The offset value in 706 can be determined first (i.e. initialized) using a value obtained by previous experimentations with a number of drives. This offset value is generally good to reverse the direction of the read-write head. Further, the performance of the return can be used to continually adjust the offset value to be used on a next run. One of the criteria for judging the performance of the read-write head reversing direction is the time duration needed for the read-write head to begin the reversal and complete track reacquisition (e.g., from 422 to 450 in FIG. 4.)

Before launching the read-write head, the system identifies a trajectory or runway for launching the read-write head by setting a launch location at a safe distance away from a target write location or track (block 708). The safe distance is defined as a distance long enough, with enough margins that the read-write head does not cross to the blank disk area unexpectedly.

The system measures the identified trajectory or runway by repeating the seek-by-dragging process N times (block 710). For example, the seek-by-dragging process can be repeated 20-30 times or for 20-30 samples, or 20-30 wedges to build up the velocity from 0 (stand-still) to the desired velocity. The number for N depends on the desired velocity and the sample times (i.e. time between wedges). Repeating the seek-by-dragging process facilitates determination of the runway needed for the read-write head to build up to the desired target velocity. Starting from the initially identified launch track, the seek-by-dragging process is repeated until the desired velocity is achieved. The system then adjusts the launch track based on the measured runway to ensure that the read-write head arrives at the target track at the desired target velocity (block 712).

The system determines whether the read-write head arrives at the target track at the desired velocity (block 713). The process repeats blocks 708, 710 and 712 until the system detects that the read-write head arrives at the target track at the desired velocity. Thus, the runway calculated in bock 710 can be repeated for robustness. This outer loop (blocks 708-712) can be repeated 3-10 times for the added benefits of thermal stability.

When the runway has been measured and the launch track adjusted (e.g., at the conclusion of the outer loop), the system the launch location is optimized to achieve the desired velocity at the target location. At this time, the system controls the read-write to begin a write session. The system controls the read-write head to seek to the launch track (block 714) until a desired wedge number is obtained (block 716). Then, the system initiates the seek-by-dragging process to move the read-write head along the measured runway (block 718).

The seek-by-dragging processes in blocks 710 and 718 are the same in principle. The seek-by-dragging process in block 710 described above is implemented to determine the optimal launch location and adapt the read-write head for the optimized launch location. In addition, the seek-by-dragging process of block 710 is used to get the read-write head at a ready state.

Thus, the launch location is known when performing the seek-by-dragging process in block 718. The seek-by-dragging process of block 718 is implemented when performing the actual ramp-track write process.

At the ready state, the system determines the VCM current needed to move the read-write head at the target speed at the target location. This VCM current as determined at block 704 is applied at the end of the seek-by-dragging to maintain the read-write head at the desired velocity. Then, once the desired wedge is determined at block 716, the ramp-track writing starts on the desired wedge. The system waits for the determined wedge before moving the read-write head.

While the drag-and-seek process of block 718 is used to write the ramp-track number, the system first builds up the velocity of the head-write head before performing ramp-track writing. Once the desired velocity has been obtained, the system performs additional checks to make sure everything is functional before turning on the write gate. In particular, the system detects the movement of the read-write head to determine whether the read-write head arrives at the target start writing track at the desired target velocity (block 720). When detected that the read-write head did not arrive at the target track at the target velocity, the system controls the read-write head to seek to the launch track (block 714), wait for the desired wedge number (block 716) and restart the seek-by-dragging process (block 718).

When the system detects that the read-write head arrives at the target track at the target velocity, the system turns on the write gate in block 724. The system turns on the write gate for a period of time to complete writing of a ramp-track. For example, after turning on the write gate, the system 100 waits a period of time (block 726) before turning off the write gate and applying the set reverse VCM current (block 728). The period of time to wait before turning off the write gate is dependent on the ability of the system to keep the read-write head moving at constant velocity within some tolerance (e.g., about 1%). An example range for the period of time to wait can be between near 1ms which is about 400 tracks to 4 ms or about 1600 tracks.

As the read-write head reverses its trajectory and returns to the final servo tracks, the system determines whether the read-write head detected one of the final servo tracks (block 730). When one of the tracks is detected, the system records the time of the detection and grabbing of the detected track (block 732). This time of the track detection is recorded to adjust the Reverse_VCM_Current (see block 706). If this time is too long or too short, the Reverse_VCM Current (i.e., the other current) is adjusted for use in the next write session. This adjustment to the other current is performed to optimize the writing process with respect to time and reliability. Then the system controls the read-write head to seek to a track offset from the launch track (block 734).

The system adjusts the applied reverse VCM current based on the time of detection (block 736). When the system detects that a desired number of ramp-tracks have been written (block 740), an end of the process 700 is indicated and the process 700 ends. When the system detects that additional ramp-tracks should be written, the process 700 loops back to control the read-write head to seek to the launch track to start another write session with a new start writing location (block 714).

FIGS. 8A-8F show various exemplary implementations of the described systems and techniques. Referring now to FIG. 8A, the described systems and techniques can be implemented in a digital versatile disk (DVD) drive 810. The described systems and techniques may be implemented in either or both signal processing and/or control circuits, which are generally identified in FIG. 8A at 812, and/or mass data storage of the DVD drive 810. The signal processing and/or control circuit 812 and/or other circuits (not shown) in the DVD 810 may process data, perform coding and/or encryption, perform calculations, and/or format data that is read from and/or data written to an optical storage medium 816. In some implementations, the signal processing and/or control circuit 812 and/or other circuits (not shown) in the DVD drive 810 can also perform other functions such as encoding and/or decoding and/or any other signal processing functions associated with a DVD drive.

The DVD drive 810 may communicate with an output device (not shown) such as a computer, television or other device via one or more wired or wireless communication links 817. The DVD drive 810 may communicate with mass data storage 818 that stores data in a nonvolatile manner. The mass data storage 818 may include a hard disk drive (HDD). The HDD may be a mini HDD that includes one or more platters having a diameter that is smaller than approximately 1.8". The DVD drive 810 may be connected to memory 819 such as RAM, ROM, low latency nonvolatile memory such as flash memory and/or other suitable electronic data storage.

Referring now to FIG. 8B, the described systems and techniques can be implemented in a high definition television (HDTV) 820. The described systems and techniques may be implemented in either or both signal processing and/or control circuits, which are generally identified in FIG. 8B at 822, a WLAN interface and/or mass data storage of the HDTV 820. The HDTV 820 receives HDTV input signals in either a wired or wireless format and generates HDTV output signals for a display 826. In some implementations, signal processing circuit and/or control circuit 822 and/or other circuits (not shown) of the HDTV 820 may process data, perform coding and/or encryption, perform calculations, format data and/or perform any other type of HDTV processing that may be required.

The HDTV 820 may communicate with mass data storage 827 that stores data in a nonvolatile manner such as optical and/or magnetic storage devices. At least one DVD drive may have the configuration shown in FIG. 8A. The HDD may be a mini HDD that includes one or more platters having a diameter that is smaller than approximately 1.8". The HDTV 820 may be connected to memory 828 such as RAM, ROM, low latency nonvolatile memory such as flash memory and/or other suitable electronic data storage. The HDTV 820 also may support connections with a WLAN via a WLAN interface 829.

Referring now to FIG. 8C, the described systems and techniques may be implemented in a control system of a vehicle 830, a WLAN interface and/or mass data storage of the vehicle control system. In some implementations, the described systems and techniques may be implemented in a powertrain control system 832 that receives inputs from one or more sensors 836 such as temperature sensors, pressure sensors, rotational sensors, airflow sensors and/or any other suitable sensors and/or that generates one or more output control signals to one or more output devices 838. The output control signals can include engine operating parameters, transmission operating parameters, braking parameters, and/or other control signals.

The described systems and techniques may also be implemented in other control systems 840 of the vehicle 830. The control system 840 may likewise receive signals from input sensors 842 and/or output control signals to one or more output devices 844. In some implementations, the control system 840 may be part of an anti-lock braking system (ABS), a navigation system, a telematics system, a vehicle telematics system, a lane departure system, an adaptive cruise control system, a vehicle entertainment system such as a stereo, DVD drive, compact disk drive and the like. Still other implementations are contemplated.

The powertrain control system 832 may communicate with mass data storage 846 that stores data in a nonvolatile manner. The mass data storage 846 may include optical and/or magnetic storage devices for example hard disk drives HDD and/or DVD drives. At least one DVD drive may have the configuration shown in FIG. 8A. The HDD may be a mini HDD that includes one or more platters having a diameter that is smaller than approximately 1.8". The powertrain control system 832 may be connected to memory 847 such as RAM, ROM, low latency nonvolatile memory such as flash memory and/or other suitable electronic data storage. The powertrain control system 832 also may support connections with a WLAN via a WLAN interface 848. The control system 840 may also include mass data storage, memory and/or a WLAN interface (all not shown).

Referring now to FIG. 8D, the described systems and techniques can be implemented in a cellular phone 850 that may include a cellular antenna 851. The described systems and techniques may be implemented in either or both signal processing and/or control circuits, which are generally identified in FIG. 8D at 852, a WLAN interface and/or mass data storage of the cellular phone 850. In some implementations, the cellular phone 850 includes a microphone 856, an audio output 858 such as a speaker and/or audio output jack, a display 860 and/or an input device 862 such as a keypad, pointing device, voice actuation and/or other input device. The signal processing and/or control circuits 852 and/or other circuits (not shown) in the cellular phone 850 may process data, perform coding and/or encryption, perform calculations, format data and/or perform other cellular phone functions.

The cellular phone 850 may communicate with mass data storage 864 that stores data in a nonvolatile manner such as optical and/or magnetic storage devices for example hard disk drives HDD and/or DVD drives. At least one DVD drive may have the configuration shown in FIG. 8A. The HDD may be a mini HDD that includes one or more platters having a diameter that is smaller than approximately 1.8". The cellular phone 850 may be connected to memory 866 such as RAM, ROM, low latency nonvolatile memory such as flash memory and/or other suitable electronic data storage. The cellular phone 850 also may support connections with a WLAN via a WLAN interface 868.

Referring now to FIG. 8E, the described systems and techniques can be implemented in a set top box 880. The described systems and techniques may be implemented in either or both signal processing and/or control circuits, which are generally identified in FIG. 8E at 884, a WLAN interface and/or mass data storage of the set top box 880. The set top box 880 receives signals from a source 882 such as a broadband source and outputs standard and/or high definition audio/video signals suitable for a display 888 such as a television and/or monitor and/or other video and/or audio output devices. The signal processing and/or control circuits 884 and/or other circuits (not shown) of the set top box 880 may process data, perform coding and/or encryption, perform calculations, format data and/or perform any other set top box function.

The set top box 880 may communicate with mass data storage 890 that stores data in a nonvolatile manner. The mass data storage 890 may include optical and/or magnetic storage devices for example hard disk drives HDD and/or DVD drives. At least one DVD drive may have the configuration shown in FIG. 8A. The HDD may be a mini HDD that includes one or more platters having a diameter that is smaller than approximately 1.8". The set top box 880 may be connected to memory 894 such as RAM, ROM, low latency nonvolatile memory such as flash memory and/or other suitable electronic data storage. The set top box 880 also may support connections with a WLAN via a WLAN interface 896.

Referring now to FIG. 8F, the described systems and techniques can be implemented in a media player 900. The described systems and techniques may be implemented in either or both signal processing and/or control circuits, which are generally identified in FIG. 8F at 904, a WLAN interface and/or mass data storage of the media player 900. In some implementations, the media player 900 includes a display 907 and/or a user input 908 such as a keypad, touchpad and the like. In some implementations, the media player 900 may employ a graphical user interface (GUI) that typically employs menus, drop down menus, icons and/or a point-and-click interface via the display 907 and/or user input 908. The media player 900 further includes an audio output 909 such as a speaker and/or audio output jack. The signal processing and/or control circuits 904 and/or other circuits (not shown) of the media player 900 may process data, perform coding and/or encryption, perform calculations, format data and/or perform any other media player function.

The media player 900 may communicate with mass data storage 910 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives HDD and/or DVD drives. At least one DVD drive may have the configuration shown in FIG. 8A. The HDD may be a mini HDD that includes one or more platters having a diameter that is smaller than approximately 1.8". The media player 900 may be connected to memory 914 such as RAM, ROM, low latency nonvolatile memory such as flash memory and/or other suitable electronic data storage. The media player 900 also may support connections with a WLAN via a WLAN interface 916. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
identifying a trajectory across previously written tracks on a surface of a machine-readable medium for a read-write head to move along and build up velocity, wherein identifying the trajectory comprises
identifying one of the previously written tracks as a launch location from which to launch the read-write head, and
identifying a start writing location near a blank region of the surface of the machine-readable medium at which to turn on a write gate;
applying a current to a positioning device associated with the read-write head to cause the read-write head to move along the trajectory; and
adjusting the identified launch location until a target velocity is obtained at the start writing location.

2. The method of claim 1, wherein adjusting the identified launch location comprises:
detecting a distance traveled by the read-write head to obtain the target velocity; and
adjusting the identified launch location based on the detected distance.

3. The method of claim 1, wherein adjusting the identified launch location comprises:
adjusting a radial position associated with a track number and an angular position associated with a wedge number.

4. The method of claim 1, further comprising:
turning on the write gate on the read-write head for a period of time to begin a write session when the read-write head reaches the start writing location at the target velocity; and
applying another current to reverse a direction of the read-write head.

5. The method of claim 4, further comprising:
controlling the read-write head to detect one of the previously written tracks different from the launch location in preparation for a next write session; and
adjusting the applied other current based on the read-write head detecting the one of the previously written tracks.

6. The method of claim 4, further comprising applying the other current at an end of the period of time for turning on the write gate.

7. The method of claim 4, further comprising adjusting the applied other current to cause the read-write head to obtain a velocity needed to detect one of the previously written tracks.

8. The method of claim 4, further comprising adjusting the applied other current based on a detected time period for applying the other current and detecting one of the previously written tracks.

9. The method of claim 1, wherein identifying the trajectory comprises:
test launching the read-write head at least once until the read-write head moves along the trajectory at the target velocity.

10. The method of claim 9, wherein adjusting the identified launch location comprises:
based on the test launching, adjusting the identified launch location until the read-write head moves at the target velocity at the start writing location.

11. The method of claim 10, further comprising:
launching the read-write head from the adjusted launch location; and
detecting whether the read-write head arrives at the start writing location at the target velocity.

12. The method of claim 11, wherein detecting whether the read-write head arrives at the start writing location at the target velocity comprises applying a seek-by-dragging process including:
launching the read-write head from the adjusted launch location;
dragging a target ahead of the read-write head along the identified trajectory for the read-write head to seek; and
adjusting the applied current to cause the launched read-write head to seek the dragged target by accelerating along the trajectory until obtaining the target velocity at the start writing location.

13. The method of claim 9, wherein test launching the read-write head comprises applying a seek-by-dragging process including:
launching the read-write head from the launch location;
dragging a target ahead of the read-write head across the previously written tracks for the read-write head to seek; and
adjusting the applied current to cause the launched read-write head to seek the dragged target by accelerating along the trajectory until obtaining the target velocity.

14. The method of claim 13, further comprising repeating the seek-by-dragging process until the target velocity is obtained.

15. A computer program product, tangibly embodied on a non-transitory computer-readable medium, operable to cause a data processing apparatus to perform operations comprising:
identifying a trajectory across previously written tracks on a surface of a machine-readable medium for a read-write head to move along and build up velocity, wherein identifying the trajectory comprises
identifying one of the previously written tracks as a launch location from which to launch the read-write head, and
identifying a start writing location near a blank region of the surface of the machine-readable medium at which to turn on a write gate;
applying a current to a positioning device associated with the read-write head to cause the read-write head to move along the trajectory; and
adjusting the identified launch location until a target velocity is obtained at the start writing location.

16. The computer program product of claim 15, further operable to cause a data processing apparatus to adjust the identified launch location comprising:
detecting a distance traveled by the read-write head to obtain the target velocity; and
adjusting the identified launch location based on the detected distance.

17. The computer program product of claim 15, further operable to cause a data processing apparatus to adjust the identified launch location comprising:
adjusting a radial position associated with a track number and an angular position associated with a wedge number.

18. The computer program product of claim 15, further operable to cause a data processing apparatus to perform operations comprising:

turning on the write gate on the read-write head for a period of time to begin a write session when the read-write head reaches the start writing location at the target velocity; and applying another current to reverse a trajectory of the read-write head.

19. The computer program product of claim 18, further operable to cause a data processing apparatus to perform operations comprising:
controlling the read-write head to detect one of the previously written tracks different from the launch location in preparation for a next write session; and
adjusting the applied other current based on the read-write head detecting the one of the previously written tracks.

20. The computer program product of claim 18, further operable to cause a data processing apparatus to perform operations comprising applying the other current at an end of the period of time for turning on the write gate.

21. The computer program product of claim 18, further operable to cause a data processing apparatus to perform operations comprising adjusting the applied other current to cause the read-write head to obtain a velocity needed to detect one of the previously written tracks.

22. The computer program product of claim 18, further operable to cause a data processing apparatus to perform operations comprising adjusting the applied other current based on a detected time period for applying the other current and detecting one of the previously written tracks.

23. The computer program product of claim 15, further operable to cause a data processing apparatus to identify the trajectory comprising:
test launching the read-write head at least once until the read-write head moves along the trajectory at the target velocity.

24. The computer program product of claim 23, further operable to cause a data processing apparatus to adjust the identified launch location comprising:
based on the test launching, adjusting the identified launch location until the read-write head moves at the target velocity at the start writing location.

25. The computer program product of claim 24, further operable to cause a data processing apparatus to perform operations comprising:
launching the read-write head from the adjusted launch location; and
detecting whether the read-write head arrives at the start writing location at the target velocity.

26. The computer program product of claim 25, further operable to cause a data processing apparatus to detect whether the read-write head arrives at the start writing location at the target velocity by applying a seek-by-dragging process comprising:
launching the read-write head from the adjusted launch location;
dragging a target ahead of the read-write head along the identified trajectory for the read-write head to seek; and
adjusting the applied current to cause the launched read-write head to seek the dragged target by accelerating along the trajectory until obtaining the target velocity at the start writing location.

27. The computer program product of claim 23, further operable to cause a data processing apparatus to test launch the read-write head by applying a seek-by-dragging process comprising:

launching the read-write head from the launch location;
dragging a target ahead of the read-write head across the previously written tracks for the read-write head to seek; and
adjusting the applied current to cause the launched read-write head to seek the dragged target by accelerating along the trajectory until obtaining the target velocity.

28. The computer program product of claim 27, further operable to cause a data processing apparatus to repeat the seek-by-dragging process until the target velocity is obtained.

29. An apparatus comprising:
a head-disk assembly including
a transducer comprising a read-write head having a write gate;
a positioning device connected to the read-write head and configured to move the read-write head in response to a stimulus; and
a spindle for rotating a machine-readable medium; and
a control unit connected with the head-disk assembly to cause the head-disk assembly to perform operations comprising
identifying a trajectory across previously written tracks on a surface of the machine-readable medium for the read-write head to move along and build up velocity, wherein identifying the trajectory comprises
identifying one of the previously written tracks as a launch location from which to launch the read-write head, and
identifying a start writing location near a blank region of the machine-readable medium at which to turn on a write gate;
applying a current to the positioning device connected to the read-write head to cause the read-write head to move along the trajectory; and
adjusting the identified launch location until the read-write head obtains a target velocity at the start writing location.

30. The apparatus of claim 29, wherein adjusting the identified launch location comprises:
detecting a distance traveled by the read-write head to obtain the target velocity; and
adjusting the identified launch location based on the detected distance.

31. The apparatus of claim 29, wherein adjusting the identified launch location comprises:
adjusting a radial position associated with a track number and an angular position associated with a wedge number.

32. The apparatus of claim 29, wherein the operations comprise:
turning on the write gate on the read-write head for a period of time to begin a write session when the read-write head reaches the start writing location at the target velocity; and
applying another current to reverse a trajectory of the read-write head.

33. The apparatus of claim 32, wherein the operations comprise:
controlling the read-write head to detect one of the previously written tracks different from the launch location in preparation for a next write session; and
adjusting the applied other current based on the read-write head detecting the one of the previously written tracks.

34. The apparatus of claim 32, wherein the operations comprise applying the other current at an end of the period of time for turning on the write gate.

35. The apparatus of claim 32, wherein the operations comprise adjusting the applied other current to cause the read-write head to obtain a velocity needed to track one of the previously written tracks.

36. The apparatus of claim 32, wherein the operations comprise adjusting the applied other current based on a detected time period for applying the other current and detecting one of the previously written tracks.

37. The apparatus of claim 29, wherein the control unit is configured to identify the trajectory comprising:
  test launching the read-write head at least once until the read-write head moves along the trajectory at the target velocity.

38. The apparatus of claim 37, wherein the control unit is configured to adjust the identified launch location comprising:
  based on the test launching, adjusting the identified launch location until the read-write head moves at the target velocity at the start writing location.

39. The apparatus of claim 38, wherein the control unit is further configured to:
  launch the read-write head from the adjusted launch location; and
  detect whether the read write head arrives at the start writing location at the target velocity.

40. The apparatus of claim 39, wherein the control is further configured to detect whether the read-write head arrives at the start writing location at the target velocity by applying a seek-by-dragging process comprising:
  launch the read-write head from the adjusted launch location;
  drag a target ahead of the read-write head along the identified trajectory for the read-write head to seek; and
  adjust the applied current to cause the launched read-write head to seek the dragged target by accelerating along the trajectory until obtaining the target velocity at the start writing location.

41. The apparatus of claim 37, wherein the control unit is configured to test launch the read-write head by applying a seek-by-dragging process comprising:
  launching the read-write head from the launch location;
  dragging a target ahead of the read-write gate across the previously written tracks for the read-write head to seek; and
  adjusting the applied current to cause the launched read-write head to seek the dragged target by accelerating along the trajectory until obtaining the target velocity.

42. The apparatus of claim 41, wherein the control unit is configured to repeat the seek-by-dragging process until the target velocity is obtained.

* * * * *